April 28, 1970     G. T. INOUYE     3,509,424

FLUXGATE MAGNETOMETER DRIVE CIRCUIT

Filed Jan. 25, 1968

George T. Inouye
INVENTOR

BY
Donald C. Keaveney
ATTORNEY

The United States Patent Office 3,509,424
Patented Apr. 28, 1970

3,509,424
FLUXGATE MAGNETOMETER DRIVE CIRCUIT
George T. Inouye, Palos Verdes Peninsula, Calif., assignor to TRW Inc., Redondo Beach, Calif., a corporation of Ohio
Filed Jan. 25, 1968, Ser. No. 700,396
Int. Cl. G01r 33/02
U.S. Cl. 317—148.5         7 Claims

ABSTRACT OF THE DISCLOSURE

This invention relates to a drive circuit for a fluxgate magnetometer which is such that the second harmonic frequency of the drive frequency is minimized in the drive signal in order not to interfere with signal output from the magnetometer at said second harmonic frequency and which is such that current is drawn only one-half of the time, thereby conserving on the power consumption of the instrument and consequently reducing the weight of the necessary power supply. These features are achieved by deriving the drive voltage from a crystal oscillator or other stabilized frequency source which has a frequency four times that of the desired frequency and which is connected to a drive circuit through a pair of series connected divided-by-two flip-flops to develop a square wave.

BACKGROUND OF THE INVENTION

This invention relates to fluxgate magnetometer drive circuits which may, for example, be used in magnetometers of the type described in a book entitled, Methods and Techniques in Geophysics, edited by S. K. Runcorn and published in 1960 by Interscience Publishers Inc. of New York. Reference is particularly made to pages 139 through 147 of this book and more generally to all of the article entitled, "Measurement of the Geomagnetic Elements" by K. Whitham, beginning on page 104. Both field of invention and the relevent prior art are well set forth therein.

In a particular application the objective of the fluxgate magnetometer drive circuit was to generate a sinusoidal current of approximately 80 milliamperes peak to peak in the drive coil of the fluxgate sensor. Typically, the drive frequency may be 11 kilocycles and the waveform should not contain any second harmonic components since this is the signal frequency in the output of the magnetometer which contains the information as to the magnitude and direction of the magnetic field being measured. The manner in which this second harmonic component of the output signal is analyzed for such measurement is clearly set forth in the above-noted text.

SUMMARY OF THE INVENTION

In order to minimize the second harmonic content, the drive waveform is derived from a divided-by-two flip-flop which is driven by a 22 kilocycle waveform. A 44 kilocycle crystal oscillator is normally used as the primary frequency source to eleminate frequency variations which would cause undesired phase shifts within the instruments. A 22 kilocycle reference frequency signal is derived from a first divided-by-two flip-flop and is applied both to a synchronous detector to the other input of which the second harmonic output from the magnetometer sensor is applied and also to a second divide-by-two flip-flop the output from which is the 11 kilocycle signal applied to the drive circuit of the sensor. Normally, the drive circuit operates as a push-pull Class B amplifier with an input which is a push-pull square wave and with an output transformer tuned to 11 kilocycles. The secondary of the transformer matches the sensor drive coil. In the present circuit, both the 22 kilocycle and the 11 kilocycle square wave signals are combined and are applied to the drive circuit in a manner described below such that current is drawn only one-half of the time, thereby conserving on the power consumption of the instrument.

BRIEF DESCRIPTION OF THE DRAWING

In the drawing.

Turning to FIGURE 1, there is shown a block diagram of a typical fluxgate magnetometer as described in greater detail in the above-referenced book by Runcorn. The magnetometer includes a sensor 10 which is a magnetizable core which is driven in and out of saturation by the driver 11. In the absence of any component of ambient magnetic field, the peaks detected in the output voltage from the sensor 10 will be uniform. In the presence of a magnetic field, the peaks vary in a manner which is well understood in the art and which is measured by applying the output voltage through an output amplifier 12 to one input of a synchronous detector circuit 13. The other input to synchronous detector 13 is derived from the crystal oscillator 14 through a divide-by-two flip-flop 15 which has its output connected to the second input of synchronous detector 13 and also through a second divide-by-two flip-flop 16 to the driver circuit 11. The flip-flop 16 develops a square wave which is impressed on the driver circuit 11. Such a square wave has only odd harmonics, and hence, minimizes the second harmonic frequency of the drive frequency. The output of the synchronous detector 13 is a DC voltage which affords a measure of the ambient field sensed by the core of the sensor 10.

Figure 1:
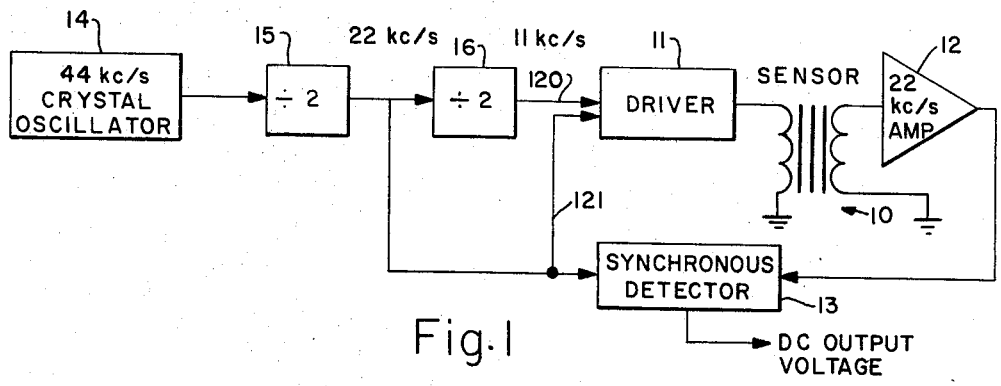
FIGURE 1 is a block diagram of the fluxgate magnetometer.

In the example shown, it will be noted that the crystal oscillator 14 is tuned to a 44 kilocycle frequency so that the output of the first flip-flop 15 is at 22 kilocycles. It is this 22 kilocycle voltage which is applied to one side of the synchronous detector 13 and also to the second dividing flip-flop 16. The output of flip-flop 16 is an 11 kilocycle voltage which is apppied through the driver circuit 11 to the sensor 10. Thus, the fundamental frequency at which the sensor 10 is driven alternatively in an out of saturation is 11 kilocycles. As has been noted above, the information with respect to the ambient magnetic field is contained in the second harmonic of this fundamental frequency to which the amplifier 12 is tuned. This second harmonic is, of course, 22 kilocycles which is the operating frequency of the synchronous detector 13.

Figure 2:
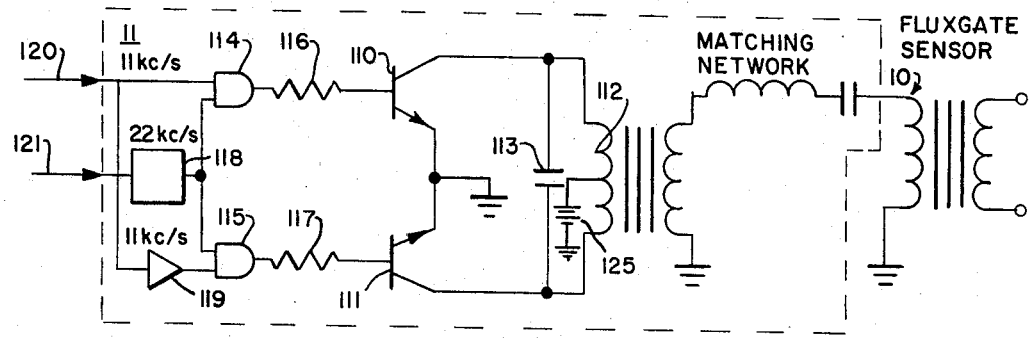
FIGURE 2 is a circuit diagram for the driver circuit of the magnetometer.

In FIGURE 2 there is shown a detailed circuit diagram of the driver circuit 11 in the block diagram of FIGURE 1. Driver 11, it will be seen, consists of a pair of transistors 110 and 111 which may be of the NPN type as shown and which are connected to operate as a push-pull Class B amplifier with the primary winding 112 of an output transformer driven thereby and tuned to the 11 kilocycle fundamental drive frequency. The drive circuit 11 may be energized by a battery 125 having its negative terminal grounded and its positive terminal connected to the midpoint of the primary winding 112. Tuning may readily be achieved by capacitor 113. This output transformer is connected through a matching network to match impedances to the drive coil of the fluxgate sensor 10.

The push-pull connected transistor amplifiers 110–111 are driven through respective gate circuits 114 and 115 which have output resistors 116 and 117 connected from the gate output to the base of the transistors 110 and 111, respectively. The gate circuits 114 and 115 may be any logical "and" circuit, many types of which are well known in the art.

The inputs to driver circuit 11 (which is shown enclosed in the dash line block in FIGURE 2) are derived over input lines 120 and 121. As can be seen by comparing FIGURES 1 and 2, the line 120 carries the 11 kilocycle output of flip-flop 16, whereas the line 121 carries the 22 kilocycle output of flip-flop 15. Line 120 is connected directly to one input of the first "and" gate 114 and is connected through an inverter amplifier 119 to one input of the second gate 115. The 22 kilocycle voltage on input line 121 is connected through a 90° phase shifter 118 and thence to the second input of each of the gate circuits 114 and 115. The effect of this type of connection is illustrated graphically in the waveforms of FIGURE 3.

Figure 3:
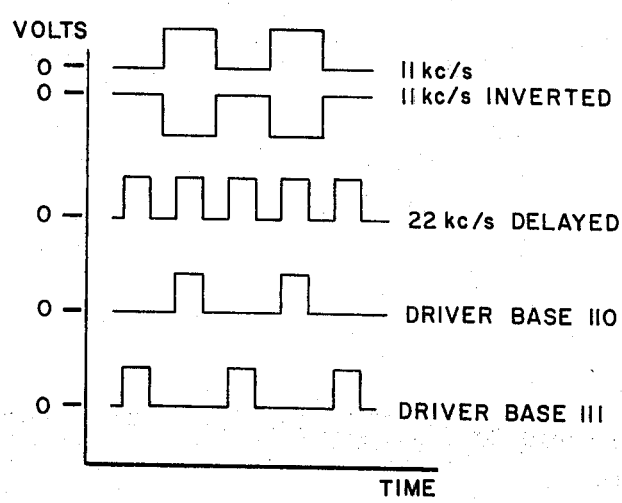
FIGURE 3 is a graph illustrating voltage waveforms which occur in the driver circuit of FIGURE 2 as a function of time.

In FIGURE 3, there is shown a graph in which volts on the vertical axis are plotted as a function of time on the horizontal axis for various waveforms in the circuit of FIGURE 2, each of which has its own separate zero level as indicated on the voltage axis. Starting at the upper waveform in FIGURE 3, the 11 kilocycle voltage applied to input line 120 is first depicted. The next waveform is the inverted 11 kilocycle voltage which is derived as the output of the inverter 119. Next there is shown the 22 kilocycle voltage which is derived as the output from the phase shifter or delay network 118, which is preferably used to introduce a small delay such as 90° in the voltage applied over input line 121 in order to avoid exact coincidence of the leading edges of the 11 and 22 kilocycle inputs applied to gate circuits 114 and 115. Finally, the next waveform represents the output of "and" circuit 114 which is applied to the base of driver 110 and the lower waveform represents the output of "and" circuit 115 which is applied to the base of driver 11.

It will be noted that the 22 kilocycle voltage is in effect used to gate a portion of both the original and the inverted 11 kilocycle signal so that the push-pull arrangement is driven during only half of the total time duration of these respective signals. Since each excursion of the 22 kilocycle square wave has a width or time duration only half that of the 11 kilocycle signal, it follows that this must necessarily be so by virtue of the operation of the "and" gate in the circuit shown. Thus, in this manner, the 22 kilocycle and the 11 kilocycle square wave signals are combined so that current is drawn only one-half of the time, thereby conserving on the power consumption of the instrument.

The fact that current is drawn only half of the time is an obvious advantage. Furthermore, the power dissipated in the driver transistors is small because the collectors are shorted to the emitters when current is being drawn. Because they are used in a switching mode, the tolerances on the transistor parameters are relaxed. Since the drive circuit power consumption is a major portion of the power required in the total instrument, this saving is a great advantage for airborne instruments where weight considerations place a limit on available power.

It is possible to combine the 44 kilocycle drive in addition to the 22 and 11 kilocycle drive signals to thereby further reduce the power consumption by drawing current only during ¼ of the 11 kilocycle signal waveform. Such an extension is by straightforward analogy to that illustrated herein. Since the 22 kilocycle and 44 kilocycle signals are already available in the circuit as originally designed, the only additional circuitry required for such a power saving arrangement are the gating logic stages which are available in a single integrated circuit component.

While a specific preferred embodiment of the invention has been described by way of illustration only, it will be understood that the invention is capable of many other specific embodiments and modifications and is defined solely by the following claims.

What is claimed is:
1. A drive circuit comprising:
 (a) a push-pull power amplifier;
 (b) power source means to provide an output having a first frequency;
 (c) means to derive from said output a signal of a second frequency which is a predetermined fraction of said first frequency;
 (d) first and second gate means connected to control said push-pull amplifier;
 (e) means to apply said second frequency signal in original phase and in inverted phase to said push-pull amplifier through said first and second gate means respectively; and
 (f) means to apply said output of said first frequency to control each of said gate means to permit application of said second frequency signal through said gates only during a fraction of the time duration of said second frequency signal.

2. A drive circuit comprising:
 (a) first and second transistors connected to form a push-pull power amplifier;
 (b) power source means to provide a square wave output having a first stabilized frequency;
 (c) frequency reducing means to derive from said output a square wave signal of a second frequency which is a predetermined fraction of said first frequency;
 (d) first and second logical "and" gate means having their outputs connected respectively to the control electrodes of the transistors forming said push-pull amplifier;
 (e) means to apply said second frequency signal in original phase and in inverted phase to said push-pull amplifiers through said first and second gate means respectively; and
 (f) means to apply said output of said first frequency to control each of said gate means to permit application of said second frequency signal through said gate only during a fraction of the time duration of said second frequency signal.

3. Apparatus as in claim 2 wherein:
 (a) said power source means comprises a crystal controlled oscillator and a first divide-by-two flip-flop connected in series; and wherein
 (b) said frequency reducing means comprises a second divide-by-two flip-flop.

4. A drive circuit comprising:
 (a) first and second transistors connected to form a push-pull power amplifier;
 (b) a crystal controlled oscillator having a square wave output of a first frequency;
 (c) at least one divide-by-two flip-flop connected to derive from said output a signal of a second frequency which is a square wave having said second frequency a predetermined fraction of said first frequency;
 (d) first and second logical "and" gate means connected to apply a control signal to the base electrodes of said transistors of said push-pull amplifier, respectively.
 (e) means to apply said second frequency signal in original phase and in inverted phase to said push-pull amplifier through said first and second gate means respectively; and
 (f) means to apply said output of said first frequency to control each of said gate means to permit application of said second frequency signal through said gate only during a fraction of the time duration of said second frequency signal.

5. A fluxgate magnetometer drive circuit comprising:
 (a) push-pull power amplifier means connected to apply a drive signal to the drive coil of the sensor of said magnetometer;

(b) first and second gate circuit means connected to control said push-pull amplifier;
(c) first control means to apply a signal of the fundamental drive frequency of said sensor to a first of said gate circuits and means to apply a signal of the same frequency but inverted phase to a second of said gate circuits; and
(d) second control means to apply to each of said gate circuits a control signal to alternately open and close said gate circuits at a frequency which is an even harmonic of said first frequency.

6. Apparatus as in claim 5 wherein said push-pull power amplifier means comprises a pair of transistors connected to form said amplifier and wherein the ouputs of said first and second gate circuit means are connected to the base electrodes of said transistors, said gate circuits each comprising a logical "and" gate.

7. Apparatus as in claim 5 wherein:
(a) said first control means comprises a crystal controlled oscillator stabilized at frequency which is a harmonic of said fundamental drive frequency and the output from which is applied through at least one divide-by-two flip-flop in order to derive said signal of said fundamental drive frequency which is applied to said gate circuits and wherein;
(b) said second control means comprises circuitry to apply a signal of one of said harmonic frequencies generated by said first control means through phase shifting means to control each of said gate circuit means to permit application of said signal of said fundamental drive frequency through gate means only during a fraction of the time duration of said fundamental frequency signal.

References Cited

S. K. Runcorn, editor, Methods and Techniques in Geophysics, 1960, Interscience Publications Inc., New York, pp. 104–147.

LEE T. HIX, Primary Examiner

W. J. SMITH, Assistant Examiner

U.S. Cl. X.R.
324—43; 307—270